Nov. 24, 1964   N. E. EDWARDS ETAL   3,158,069
BRAKE OPERATING MECHANISM
Filed April 6, 1962
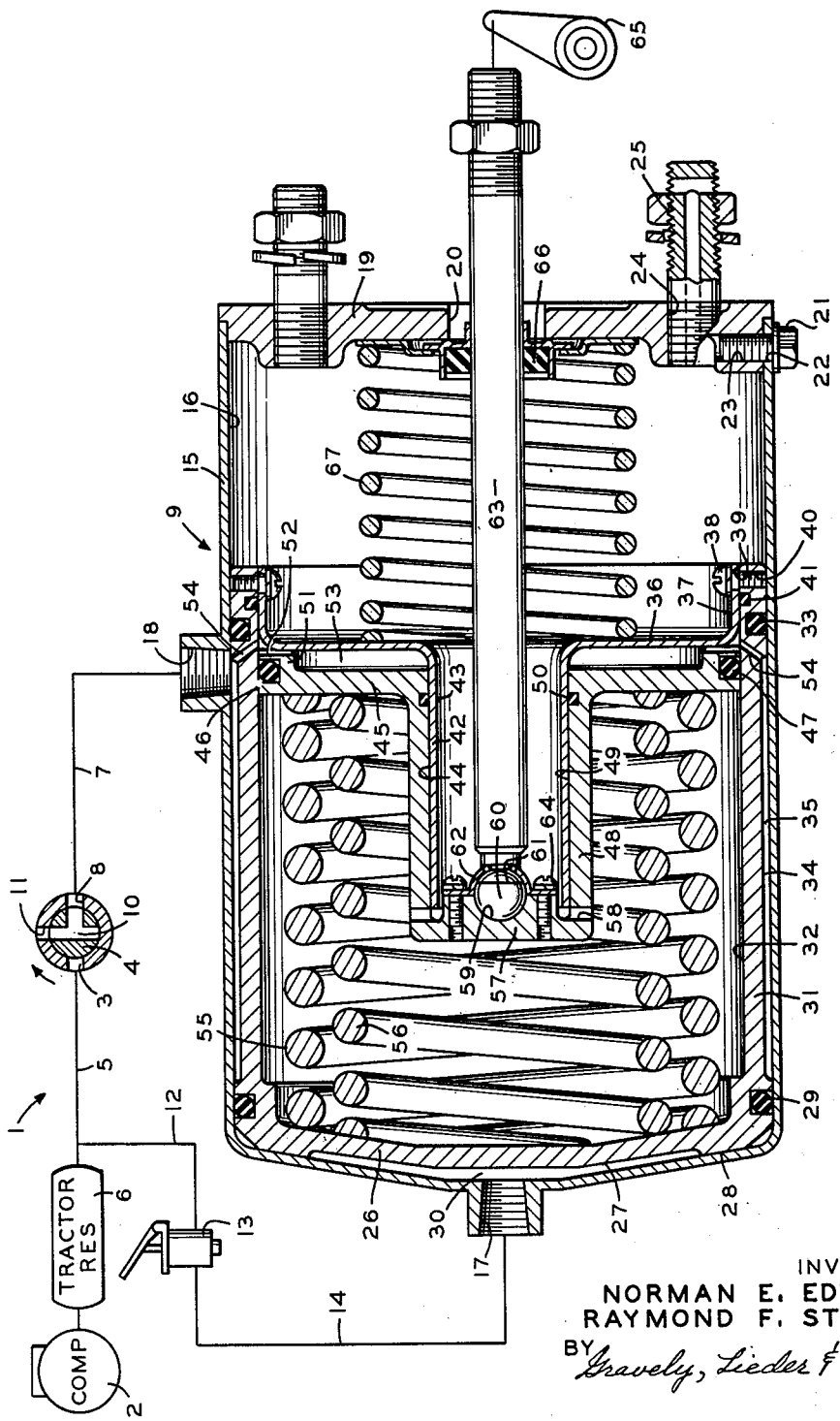
INVENTORS
NORMAN E. EDWARDS
RAYMOND F. STELZER
BY *Gravely, Lieder & Woodruff*
ATTORNEYS

United States Patent Office 3,158,069
Patented Nov. 24, 1964

3,158,069
BRAKE OPERATING MECHANISM
Norman E. Edwards, Bridgeton, and Raymond F. Stelzer, Berkeley, Mo., assignors to Wagner Electric Corporation, St. Louis, Mo., a corporation of Delaware
Filed Apr. 6, 1962, Ser. No. 185,708
4 Claims. (Cl. 92—51)

This invention relates to friction device operating mechanisms and in particular to friction device operating mechanisms having emergency actuating means therein.

The principal object of the present invention is to provide a self contained friction device operating mechanism having a piston means therein for friction device energizing purposes under normal operating conditions and emergency means cooperatively arranged within said piston means for friction device energizing purposes under emergency operating conditions.

Another object of the present invention is to provide a self contained friction device operating mechanism having a service piston with an emergency piston slidably arranged therein.

Another object of the present invention is to provide a self contained brake operating mechanism having a service piston with an emergency piston slidable therein and spring means for actuating said emergency piston contained within said service piston.

And still another object of the present invention is to provide a friction device operating mechanism having service and emergency pistons therein for friction device energizing purposes and means for limiting the friction device energizing force transmitted by said pistons.

These and other objects and advantages will become apparent hereinafter.

Briefly the invention embodies a source of fluid pressure, service means for energizing a friction device in response to applied fluid pressure from said source, and emergency means carried by said service means for energizing said friction device when the fluid pressure of said source is decreased below a predetermined minimum amount.

The invention also consists in the parts and arrangement and combination of parts hereinafter described and claimed. In the accompanying drawing which forms a part of the specification and wherein like numerals refer to like parts wherever they occur:

The figure is a diagrammatic view of a friction device operating system showing the embodiment of the present invention therein in cross-section.

Referring now to the drawing, a fluid pressure generating system, indicated generally at 1, is provided with fluid pressure generating means, such as a compressor 2, which is connected to an inlet 3 of the charging valve 4 by a conduit 5 having a fluid pressure storage reservoir 6 interposed therein, and another conduit 7 is interposed between an outlet 8 of said charging valve and the emergency port of a friction device operating mechanism or actuating cylinder, indicated generally at 9. The charging valve 4 is provided with passage means 10 normally venting the outlet 8 to atmosphere via an exhaust port 11 provided in said charging valve; however, said charging valve can be rotated clockwise (in the direction of the arrow) positioning said passage means to interrupt communication between said outlet and exhaust ports and establish pressure fluid flow communication between the inlet 3 and outlet 8. A conduit 12 has one end intersecting with the conduit 5 and the other end thereof connects with the inlet side of an application or control valve 13, and another conduit or service line 14 is interposed between the service or outlet side of said application valve and the service port of the actuating cylinder 9. The actuating cylinder 9 is provided with a housing 15 having an endwall and a sidewall with a bore 16 therein. A service port 17 which receives the service line 14, as previously described, extends through the endwall of the housing, and an emergency port 18 which receives the conduit 7, as previously described, extends through the sidewall of the housing near the mid-portion thereof. A bore closure member or end plate 19 having a centrally located bore 20 therein is fixedly poistioned in the open end of the housing bore 16 by suitable means, such as a plurality of cap screws 21, which extend through a plurality of apertures 22 in the housing 15 into threaded engagement with a plurality of cooperating radially extending apertures 23 provided in the peripheral portion of said closure member. The closure member 19 is also provided with a plurality of axially extending apertures 24 positioned radially outwardly of the closure member bore 20, and a plurality of mounting studs 25 are fixedly positioned therein, said mounting studs being provided for fixed engagement with a cooperating vehicle mounting member (not shown) to rigidly mount the actuating cylinder 9.

A cup-shaped service piston 26 is provided with a radially extending head portion 27 having an annular, axially extending flange 28 integrally formed thereon normally in abutting engagement with the endwall of the housing bore 16, and an O-ring 29 is carried in the peripheral surface of said head portion in sealable engagement with said housing bore wherein an expansible service or application chamber 30 is formed in said housing bore between the endwall thereof and said head portion. A sleeve portion 31 having a bore 32 therein is integrally formed with the piston head 27, and the rightward or free end thereof is slidably engaged with the housing bore 16 rightwardly of the emergency port 18, said sleeve portion being provided with an O-ring 33 in the free end thereof in sealable engagement with said housing bore. An annular recess 34 is provided in the peripheral surface of the sleeve 31 intermediate the O-rings 29 and 33 forming an annular chamber 35 between said sleeve and the housing bore 16 which is at all times in pressure fluid communication with the emergency port 18.

A closure member 36 is provided with an annular peripheral flange 37 which is fixedly positioned in the sleeve bore 32 adjacent the free end of said sleeve 31 by suitable means, such as a plurality of screws 38, extending through a plurality of apertures 39 in said flange into threaded engagement with a plurality of cooperating, radially extending apertures 40 provided adjacent the free end of said sleeve, and an O-ring 41 carried in said sleeve bore is sealably interposed between said sleeve and flange. The closure member 36 is provided with a centrally located integrally formed cylinder 42 which extends coaxially into the sleeve bore 32 toward the endwall of the piston head, said cylinder having a bore 43 therethrough and an annular peripheral surface 44.

An emergency piston 45 is provided with a peripheral surface 46 in sliding engagement with the sleeve bore 32, and an O-ring 47 carried in said peripheral surface is sealably engaged between said sleeve bore and emergency piston. The emergency piston 45 is also provided with an integrally formed cylindrical extension 48 having a bore 44 therein which is slidably engaged with the peripheral surface 44 of the stop member cylinder 42, and an O-ring 50 carried in the bore 49 is sealably engaged between said cylindrical extension and the peripheral surface of said stop member cylinder 42. An annular, axially extending flange 51 having a plurality of radially extending grooves or passages 52 therethrough is integrally formed on the emergency piston 45 and is normally in abutting engagement with the stop member 36. An emergency chamber 53 is formed in the sleeve bore 32 between the emergency piston 45 and the stop member 36, and a plurality of passages 54 are provided in the sleeve 31 to at all times connect said emergency chamber in pressure fluid communication with the annular chamber 35 and the emergency port 18. A pair of oppositely wound emergency springs 55 and 56 are concentrically positioned in the sleeve bore 32 and interposed between the service piston head 27 and the emergency piston 45, and the compressive force of said emergency springs normally bias the flange 51 of said emergency piston into abutting engagement with the stop member 36, as previously mentioned.

The cylindrical extension 48 of the emergency piston 45 is provided with an integrally formed endwall 57 having a plurality of vent passages 58 therethrough connecting the cylinder bore 43 of the stop member 36 with the sleeve bore 32. A hemispherical recess 59 is provided in the extension endwall 57 to pivotally receive a ball member 60 having a flat 61 thereon. A retainer 62 is fixedly attached by suitable means, such as staking, adjacent the interior end of a push rod 63, and said retainer is fixedly attached to the endwall 57 by suitable means, such as a plurality of screws 64, so that the interior end of the push rod 63 is abuttingly engaged with the flat 61 on the ball member 60. The push rod 63 extends coaxially through the cylinder bore 43 of the stop member 36, the housing bore 16, and the closure member bore 20, and the exterior end thereof is operatively connected with friction device operating linkage 65 of a friction device (not shown). A seal assembly 66 is slidably received on the push rod 63, and the compressive force of a return spring 67 interposed between the stop member 36 and said seal assembly normally biases the service piston head 27 in abutment with the endwall of the housing bore 16, as previously mentioned, and normally biases said seal assembly into engagement with the closure member 19 about the bore 20 therein to prevent the entry of foreign particles into the housing bore 16.

In the operation with the component parts of the actuating cylinder 9, positioned as above described, assume that the reservoir 6 is charged with pressure fluid and that the actuating cylinder emergency chamber 53 is vented to atmosphere through the emergency piston grooves 52, the sleeve passage 54, the annular chamber 35, the emergency port 18, the conduit 7 and the outlet 8, passage means 10 and exhaust port 11 of the charging valve 4. When the emergency chamber 53 is vented to atmosphere, the compressive forces of springs 55 and 56 are exerted against the emergency piston 45 and push rod 63 to actuate the linkage 65 and energize the friction device (not shown), as shown in the drawing. With the component parts of the actuating cylinder 9, as above described and as shown in the drawing, the friction device is energized to effect vehicle parking or an emergency stop. If the operator now attempts to make a service application, a manual force is applied to actuate the application valve 13 and meter fluid pressure from the reservoir 6 through the conduit 12, said application valve, the service line 14, the service port 17 of the actuating cylinder 9 into the service chamber 30. The fluid pressure so established in the service chamber 30 acts on the effective area of the service piston head 27 creating a service force to move the service piston rightwardly in the housing bore 16; however, since the compressive forces of springs 55 and 56 are already biasing the emergency piston 45, the push rod 63 and the linkage 65 rightwardly in a working direction to energize the friction device, as previously mentioned, the service force merely opposes the compressive forces of springs 55 and 56 and is not additive thereto to further energize the friction device. In other words when the service force attains a magnitude great enough to overcome the compressive forces of springs 55 and 56, the service piston 26 is moved rightwardly in the housing bore 16, and the emergency piston 45 remains stationary sliding in the sleeve bore 32 so that said springs are compressed between said service and emergency pistons. In view of the above, it is obvious that this compression of springs 55 and 56 absorbs the service force when the emergency chamber 53 is vented to atmosphere to limit the maximum friction device energizing force by preventing compounding of said service and spring forces, which compounding of forces would serve to bend or fracture some component parts of the actuating cylinder 9 and/or linkage 65 or friction device associated therewith.

When the applied force is removed from the application valve 13, the fluid pressure is exhausted to atmosphere from the service chamber 30 through the service port 17, the service line 14 and the exhaust port of said application valve to eliminate the service force, and the compressive forces of springs 55 and 56 return the service piston 26 to its original position in abutment with the endwall of the housing bore.

When the operator desires to de-energize the friction device in order to move the vehicle, the charging or two-way valve 4 is rotated clockwise (in the direction of the arrow) to position the passaage 10 in fluid pressure communication between the charging valve inlet and outlet 3 and 8 and close the exhaust port 11. With the charging valve 4 so positioned, fluid pressure flows from the reservoir 6 through the conduit 5, the inlet 3, passage 10 and outlet 8 of said charging valve, the conduit 7, the emergency port 18 into the annular chamber 35 and therefrom through the sleeve passages 54 and emergency piston grooves 52 into the emergency chamber 53. The fluid pressure so established in the emergency chamber 53 acts on the effective area of the emergency piston 45 to create an emergency force to move said emergency piston leftwardly in the sleeve bore 32 against the compressive forces of springs 55 and 56 compressing said springs between said emergency piston and the service piston head 27 and abutting the emergency piston endwall 57 with said piston head 27. The leftward movement of the emergency piston 45 also effects leftward movement of the piston rod 63 to move the linkage 65 and de-energize the friction device. If the operator now desires to make a service application, a manual force is applied to actuate the application valve 13 which meters fluid pressure from the reservoir 6 into the service chamber 30 of the actuating cylinder 9, as previously described, establishing a fluid pressure therein to act on the effective area of the service piston 26 and again create a service force to move said service piston rightwardly in the housing bore 16 against the return spring 67. Since the emergency force is opposing the compressive forces of springs 55 and 56 to retain said springs in their compressed position and the service and emergency pistons 26 and 45 are in abutment, said service and emergency pistons are concertly movable, and such concert movement also moves the piston rod 63 and linkage 65 rightwardly in a working direction to effect service application or energization of the friction device. When the desired rate of deceleration is attained or a stop completed, the operator removes the applied force from the application valve 13 exhausting the pressure fluid from the service chamber 30, as previously described, eliminating the service force wherein the compressive force of the return spring 67 returns the service piston 31 leftwardly to its original position, and the energy piston 45 and push rod 63 are concertly movable with said service piston to move the linkage 65 and de-energize the friction device.

In an emergency situation where the fluid pressure in the reservoir 6 is reduced below a predetermined amount due to leaks in the system 1 or a non-producing compressor 2 or the like, the fluid pressure in the emergency chamber 53 is correspondingly reduced thereby reducing the emergency force opposing the compressive force of springs 55 and 56. When the magnitude of the emergency spring forces overcomes the reduced emergency force, the springs 55 and 56 move the emergency piston 45 rightwardly in the sleeve bore 32 relative to the service piston 26 which remains in its original position, and said emergency piston carries the push rod 63 rightwardly to move the linkage 65 and effect emergency application or energization of the friction device. With the springs 55 and 56 serving to apply the friction device in an emergency situation, or for parking the vehicle, a service application by the operator will not compound the service force and spring forces since they are non-additive, as previously mentioned. When fluid pressure is re-established in the reservoir 6 and also the emergency chamber 53, the magnitude of the emergency force is correspondingly increased to again overcome the compressive force of springs 55 and 56 to move the emergency piston 45 leftwardly in the sleeve bore into abutment with the service piston head 27 and to compress said springs between said emergency piston and service piston head.

If the operator desires to "dynamite" the system 1 to initiate the emergency function of the actuating cylinder 9, the charging valve is rotated to its original position, as shown in the drawing, venting the emergency chamber 53 to atmosphere, as previously described, and eliminating the emergency force wherein the compressive forces of springs 55 and 56 move the emergency piston 45 rightwardly in the sleeve bore 32 to again move the push rod 63 and linkage 65 in a working direction to effect emergency application or energization of the friction device.

The present actuating cylinder 9 is provided with a service piston 26 which is responsive to applied service fluid pressure to normally effect a service application of the friction device. An emergency piston 45 is slidably mounted in the service piston with emergency springs 55 and 56 interposed therebetween, said springs normally being compressed between said emergency and service pistons when the system fluid pressure is above a predetermined amount. When the system fluid pressure falls below the predetermined amount, the springs 55 and 56 move the emergency piston 45 independently of the service piston 26 to effect an emergency application of the friction device, and during such an emergency application, said springs serve to absorb the force of a subsequent service application to prevent compounding of such applications and obviate bending or fracture of the component parts of the actuating cylinder 9, linkage 65 and the friction device.

It is now apparent that a novel friction device operating mechanism or actuating cylinder meeting the object set out hereinbefore is provided and that changes and modifications in the disclosure may be made by those skilled in the art without departing from the spirit of the invention as defined by the claims which follow.

What we claim is:

1. An actuating cylinder comprising a housing having an annular sidewall with a bore therein and an endwall, a first piston including an integral sleeve portion slidable rectilinearly in said housing bore and a free end on said sleeve portion, a sleeve bore in said sleeve portion and coaxial with said housing bore, a first chamber in said housing bore between the endwall thereof and said first piston, an annular recess in the peripheral surface of said sleeve portion and sealing means on said first piston at each end of said annular recess, said annular recess defining a second chamber with said sidewall of said housing bore, a first fluid pressure port in the endwall of said housing bore connecting with said first chamber, a second fluid pressure port in the sidewall of said housing connecting with said second chamber, a retaining member fixedly positioned in said sleeve bore including an integrally formed cylinder extending coaxially into said sleeve bore, a cylinder bore extending axially through said cylinder, a second piston slidable rectilinearly in said sleeve bore, an integral extension on said second piston extending coaxially into said sleeve bore, an extension bore in the extension of said second piston slidably positioned on the cylinder of said retaining member, spring means in said sleeve bore between the endwall thereof and said second piston to urge said second piston into abutment with said retaining member, a third chamber in said sleeve bore between said second piston and retaining member, passage means in said sleeve portion connecting said third chamber in fluid pressure communication with said second chamber at all times, said second piston being movable in response to fluid pressure in said second port above a predetermined amount to move said extension into abutment with the endwall of said sleeve bore and to compress said spring means, and a push rod pivotally received in the endwall of the extension bore in radially spaced relation with the cylinder bore and having a work producing end extending exteriorly of said housing bore, said first and second pistons being concertly movable in response to fluid pressure in said first fluid pressure port to actuate said push rod and the work producing end thereof and the compressive force of said spring means serving to move said second piston in said sleeve bore independently of said first piston to actuate said push rod and the work producing end thereof when the fluid pressure in said second fluid pressure port is reduced below the predetermined amount.

2. The actuating cylinder according to claim 1 including passage means in the endwall of said extension bore for providing communication between said sleeve bore and housing bore, and means for venting said housing bore to the atmosphere.

3. The actuating cylinder according to claim 1 including swivel means on the endwall of said extension bore for pivotally mounting said push rod to accommodate angular displacement of the working end thereof.

4. The actuating cylinder according to claim 3 in which said housing bore has an end plate closure to define the maximum stroke of said first piston, said end plate closure being spaced from said swivel means in all positions of piston actuation and having an opening to freely accommodate said push rod therethrough, and sealing means for said push rod mounted for floating movement on said end plate closure to accommodate the angular displacement of the work producing end of said push rod.

References Cited in the file of this patent
UNITED STATES PATENTS

| | | |
|---|---|---|
| 2,962,000 | Alfieri | Nov. 29, 1960 |
| 3,065,997 | Frankhouser et al. | Nov. 27, 1962 |
| 3,081,134 | Masser | Mar. 12, 1963 |